United States Patent
Palatnik de Sousa et al.

(10) Patent No.: US 12,494,036 B2
(45) Date of Patent: Dec. 9, 2025

(54) DETAILED PERTURBATIVE HEATMAP EXPLANATIONS

(71) Applicant: Dell Products L.P., Round Rock, TX (US)

(72) Inventors: Iam Palatnik de Sousa, Rio de Janeiro (BR); Adriana Bechara Prado, Niterói (BR)

(73) Assignee: Dell Products L.P., Round Rock, TX (US)

( * ) Notice: Subject to any disclaimer, the term of this patent is extended or adjusted under 35 U.S.C. 154(b) by 402 days.

(21) Appl. No.: 18/155,195

(22) Filed: Jan. 17, 2023

(65) Prior Publication Data
US 2024/0242469 A1    Jul. 18, 2024

(51) Int. Cl.
*G06V 10/46* (2022.01)
*G06V 10/764* (2022.01)

(52) U.S. Cl.
CPC .......... *G06V 10/462* (2022.01); *G06V 10/764* (2022.01)

(58) Field of Classification Search
CPC .................. G06V 10/462; G06V 10/764
See application file for complete search history.

(56) References Cited

U.S. PATENT DOCUMENTS

| | | | | |
|---|---|---|---|---|
| 11,227,215 B2* | 1/2022 | Liu | ........ | G06N 20/00 |
| 11,263,744 B2* | 3/2022 | Yoo | ........ | G06T 7/0012 |
| 11,468,285 B1* | 10/2022 | Tang | ........ | G06V 10/255 |
| 11,507,840 B2* | 11/2022 | Ratner | ........ | G06N 20/00 |
| 11,676,283 B2* | 6/2023 | Liu | ........ | G06T 7/11 |
| | | | | 382/173 |
| 12,131,526 B2* | 10/2024 | Yamada | ........ | E21B 44/00 |
| 2006/0023948 A1* | 2/2006 | Palmadesso | ........ | G01J 3/28 |
| | | | | 382/191 |
| 2013/0227500 A1* | 8/2013 | Sakajiri | ........ | G06F 30/00 |
| | | | | 716/55 |
| 2015/0125082 A1* | 5/2015 | Won | ........ | G06V 10/462 |
| | | | | 382/195 |
| 2017/0140514 A1* | 5/2017 | Amirghodsi | ........ | G06T 5/77 |
| 2017/0287137 A1* | 10/2017 | Lin | ........ | G06V 10/454 |
| 2018/0150955 A1* | 5/2018 | Takeda | ........ | G06V 10/44 |
| 2019/0340462 A1* | 11/2019 | Pao | ........ | G06V 10/82 |
| 2020/0364540 A1* | 11/2020 | Elsayed | ........ | G06V 10/454 |
| 2020/0372309 A1* | 11/2020 | Ratner | ........ | G06N 20/00 |
| 2021/0142176 A1* | 5/2021 | Ratner | ........ | G06N 20/00 |
| 2021/0209764 A1* | 7/2021 | Goris | ........ | G06T 7/11 |
| 2021/0256707 A1* | 8/2021 | Brown | ........ | G06V 10/764 |
| 2021/0264591 A1* | 8/2021 | Park | ........ | G06T 7/0012 |

(Continued)

OTHER PUBLICATIONS

Fong, Ruth C., and Andrea Vedaldi. "Interpretable explanations of black boxes by meaningful perturbation." In Proceedings of the IEEE international conference on computer vision, pp. 3429-3437. 2017.

(Continued)

*Primary Examiner* — Aaron W Carter
(74) *Attorney, Agent, or Firm* — Workman Nydegger

(57) ABSTRACT

Saliency heatmap generation is disclosed. A mask that corresponds to an image is iteratively passed through a model. At each iteration, the output mask is optimized via gradient descent to gradually turn off one or more pixels. The output mask is iteratively passed in order to minimize contributions of pixels and to maximize a class prediction. After generating a final output mask, a saliency heatmap is generated.

14 Claims, 15 Drawing Sheets

(56) References Cited

U.S. PATENT DOCUMENTS

| | | | |
|---|---|---|---|
| 2021/0357644 A1* | 11/2021 | Jain | G06V 10/764 |
| 2022/0138505 A1* | 5/2022 | Lam | G06N 3/084 |
| | | | 382/157 |
| 2022/0222811 A1* | 7/2022 | Ratner | G06F 18/24 |
| 2022/0270384 A1* | 8/2022 | Liu | G06V 30/19007 |
| 2022/0301295 A1* | 9/2022 | Livet | G06N 3/045 |
| 2022/0343138 A1* | 10/2022 | Tang | G06N 3/0464 |
| 2023/0144724 A1* | 5/2023 | Major | G06T 7/0012 |
| | | | 382/128 |
| 2023/0146817 A1* | 5/2023 | Kluwe | A61B 5/6829 |
| | | | 600/549 |
| 2023/0206428 A1* | 6/2023 | Liu | G06T 7/0012 |
| | | | 382/128 |
| 2023/0274562 A1* | 8/2023 | Collazo | G06V 20/698 |
| | | | 382/133 |
| 2023/0351760 A1* | 11/2023 | Park | G06V 10/7715 |
| 2024/0169543 A1* | 5/2024 | Zhu | G06T 7/11 |
| 2024/0242469 A1* | 7/2024 | Palatnik de Sousa | G06V 10/462 |
| 2024/0354996 A1* | 10/2024 | Menon | G06V 10/454 |

OTHER PUBLICATIONS

Meaningful Perturbation Flute Heatmap, https://github.com/KMJ901122/Tensorflow-Interpretable-Explanations-of-Black-Boxes-by-Meaningful-Perturbation/blob/master/result/flute_heatmap.png, Aug. 11, 2022.

* cited by examiner

| | |
|---|---|
| Dog | Japanese spaniel, Maltese dog, Pekinese, Shih-Tzu, Blenheim spaniel, papillon, toy terrier, Rhodesian ridgeback, Afghan hound, basset, beagle,... (109 total classes) |
| Cat | tabby, tiger cat, Persian cat, Siamese cat, Egyptian cat, cougar |
| Bird | hen, brambling, goldfinch, house finch, junco, indigo bunting, robin, bulbul, magpie, chickadee, water ouzel, bald eagle, vulture, great grey owl, ... (49 total classes) |
| Bicycle | bicycle-built-for-two, mountain bike |
| Car | ambulance, beach wagon, convertible, jeep, limousine, minivan, Model T, sports car |

Figure 5

DETAILED PERTURBATIVE HEATMAP EXPLANATIONS

FIELD OF THE INVENTION

Embodiments of the present invention generally relate to artificial intelligence and machine learning. More particularly, at least some embodiments of the invention relate to systems, hardware, software, computer-readable media, and methods for explainable artificial intelligence and/or machine learning.

BACKGROUND

Classifier models, such as image classifiers, are often implemented as deep neural networks. Classifier models have application in tasks such as computer vision, image classification, segmentation, object detection, adversarial generation, automatic image captioning, and others. Additional applications, such as facial recognition, surveillance/security systems, autonomous vehicles, computer assisted diagnostics, camera image enhancements, some types of malware detection, are also potential applications.

Even if classifier models have good performance, explainability is not always transparent. In the case of image classification, for example, it is often difficult to explain which portions or pixels of the image were most relevant to the classification performed by the classifier model. The lack of explainability is generally true for deep learning models in general.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 5 illustrates a table mapping classes of two different image datasets;

DETAILED DESCRIPTION OF SOME EXAMPLE EMBODIMENTS

Figure 1A:
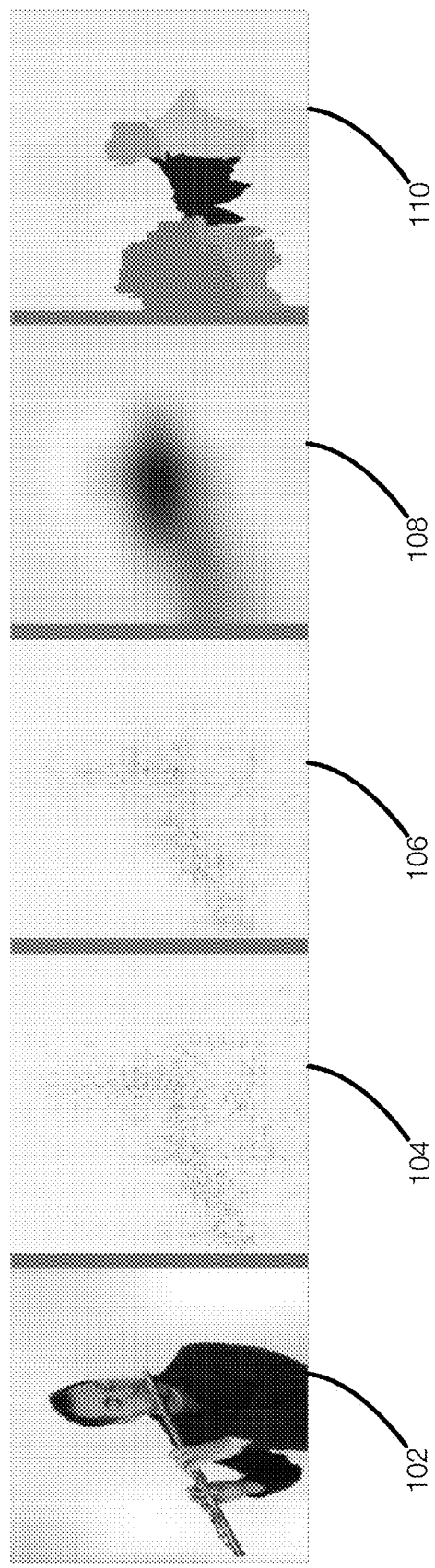
FIG. 1A discloses aspects of a panel illustrating heatmaps, each generated using a different generation technique.

Embodiments of the present invention generally relate to explainable machine learning or explainable artificial intelligence (referred to generally herein as XAI). More particularly, at least some embodiments of the invention relate to systems, hardware, software, computer-readable media, and methods for generating explanations such as saliency heatmaps.

Embodiments of the invention are discussed in the context of image classification but may be implemented in other artificial intelligence and/or machine learning models and their applications, examples of which were previously discussed.

XAI approaches image classification by generating explanations in the form of saliency heatmaps. Saliency heatmaps provide an explanation for the classification of an image by identifying relevant portions of the image that contributed to the classification. In a saliency heatmap, in one example, each pixel in the heatmap may give a corresponding importance for that pixel in the original classified image.

There are various techniques for generating saliency heatmaps. Common drawbacks to these techniques include how fast the heatmaps are generated, how to choose perturbations used to create the heatmap, and the detail level of the heatmaps. Current XAI approaches include gradient-based (gradient) techniques and perturbation-based (perturbation) techniques. These techniques may highlight different behaviors. One significant difference is that perturbation techniques cannot generate saliency heatmaps that have the same level of detail as saliency heatmaps generated using gradient techniques.

Embodiments of the invention relate to an XAI method for image classification models using a classification engine. The classification may include at least a model such as, by way of example only, EfficientNetB0 or ResNet50. The classification engine computes or generates saliency heatmaps by optimizing a mask that has been multiplied pixel-wise with the input image. The classifier engine is configured to find a minimum or reduced amount of information necessary in the original image to maximize a given output class. Stated differently, the classifier engine attempts to identify the smallest number of pixels within an image that can generate a confident prediction of a given class.

The ability to classify an image with minimal information or pixels has beneficial applications. Embodiments of the invention, for example, may maximize or improve the prediction of a tumor in a medical image, a defect in a product within a factory line, or a relevant sign detected by the cameras of an autonomous vehicle and the like. Image recognition and image classification have many different applications and the ability to improve prediction in recognition and classification contexts accuracy with fewer pixels is advantageous.

Embodiments of the invention include generating explanations (e.g., saliency heatmaps) via gradient descent using a loss function that is intended to maximize the desired class output and minimize the number of pixels contributing to the mask. Embodiments of the invention also relate to a perturbation-based approach that generates detailed pixel-level saliency heatmaps without requiring adjustment of hyperparameters for superpixel selection and without requiring superpixel selection, which occurs in other perturbation techniques.

In order to further explain embodiments of the invention, a brief description of XAI techniques is provided.

As previously stated, XAI techniques generally attempt to derive an explanation for the classifications performed by trained AI or ML. A common method is to assign an importance weight to each input feature. The importance weights, also known as feature importance values, can be either local values or global values.

For global feature importance values, each value corresponds to how a given feature might be influencing the classification when taking into the account the behavior of the entire distribution of the dataset. For example, in an image classification use-case, the top left quadrant of images may be identified as the most relevant for classifying most images in a given class, at the global level.

Local feature importance values, on the other hand, are concerned with specific instances of the data. In contrast to global importance values, some data points might specifically sway the classifier to a given class because of a particular feature only present in that specific image. For example, an image may be classified as containing a tumor because of a specific group of pixels that form a texture/discoloration, contrasting with the surrounding pixels. A local explanation would capture the insights that caused the different classification in this specific example.

Although various taxonomies of XAI methods have been proposed, with slightly differing nuances, some basic types of methods can be identified. FIGS. 1A-1F illustrate key differences between various XAI techniques.

FIG. 1A illustrates an original image 102 and saliency heatmaps 104, 106, 108, and 110 that are associated with the image 102. The heatmaps 104, 106, 108, and 110 are generated using different techniques including gradient-based techniques and perturbation-based techniques. FIG. 1A is an image whose class is "flute/transversal flute". The image 102 was correctly classified by an EfficientNetB0 model pretrained on images from the ImageNet dataset.

Gradient techniques include calculating the vector of partial derivatives (gradient) of the output layer backwards to the input layer. Gradient techniques provide information related to how small changes in the input may influence the prediction or the classification. For example, the gradient technique may show how each pixel influences the final classification.

The heatmap 104 is representative of a heatmap generated using a vanilla gradients (VG) technique. FIG. 1B illustrates a heatmap 112, which is a larger version of the heatmap 104. The vanilla gradient technique reflected in the heatmap 112 represents or is generated by a pure calculation of gradients from the output to the input. The heatmap 112 illustrates the importance of each pixel to the classification with more important pixels being shown in darker colors. In one example, when first computing the gradient back to the image, the resulting vector has the same dimension as the image, with 3 channels. Typically, in XAI techniques for images that generate outputs with that dimension, the operation to reduce them to a one-dimensional heatmap is a combination of applying a ReLU function (that is, eliminating all negative values from the heatmap), and then taking the channel-wise maximum. The vanilla gradient heatmap $\mathbb{H}_{VG}$ could be described by the equation:

$$\mathbb{H}_{VG} = \max_{channel} ReLU(\nabla_c \phi_1).$$

Saliency heatmaps generated using gradient techniques are, in general, noisy with respect to local spurious behavior of the gradient function. A smooth gradient (SG) technique reduces the impact of this noise and involves computing the vanilla gradients for several versions of the original image with some jitter, which may be gaussian noise.

By applying a small jitter to the various versions and then averaging the results, the spurious pixels highlighted by vanilla gradients are averaged out and a clearer heatmap is obtained. Thus, SG is typically considered to be more robust than VG. The heatmap 106 is an example of a heatmap generated for the image 102 using the smooth gradients technique.

Figure 1C:
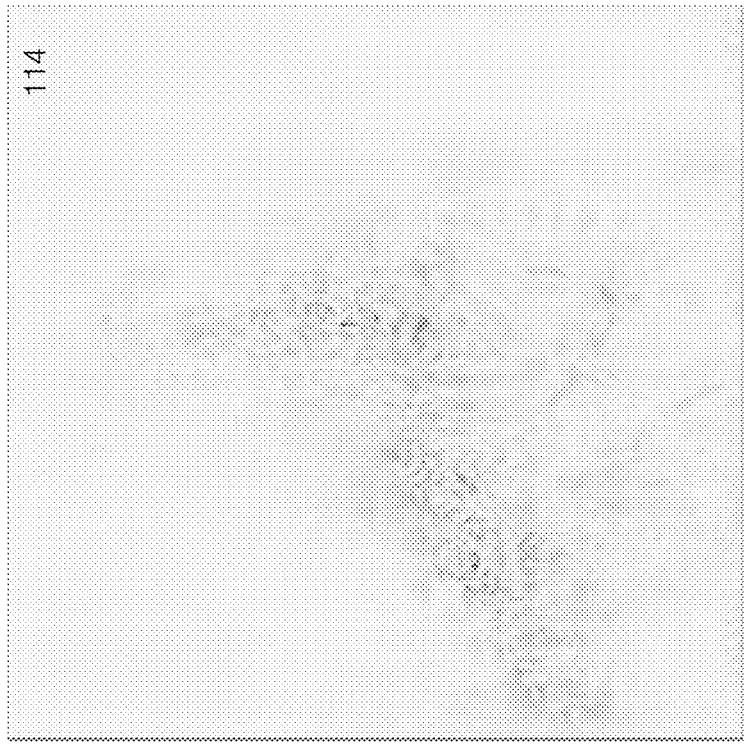
FIG. 1C discloses an enlarged version of a heatmap generated using a smooth gradient-based technique.
Figure 1B:
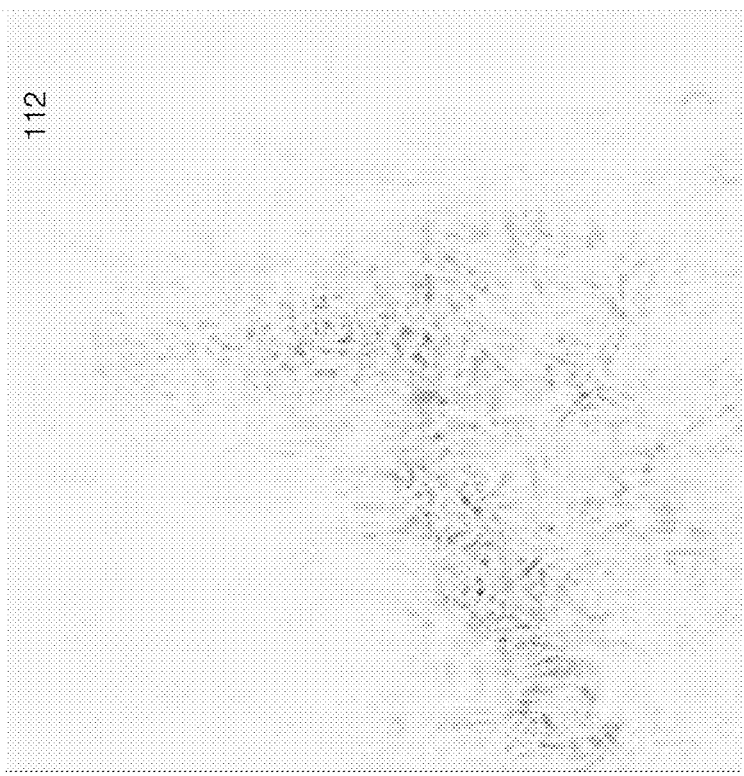
FIG. 1B discloses an enlarged version of a heatmap generated using a vanilla gradient-based technique.

FIG. 1C illustrates heatmap 114, which is a larger version of the heatmap 106. FIG. 1C illustrates that the heatmap 114, generating using SG, is clearer than the heatmap 112, which was derived using VG.

Perturbation techniques, in contrast to gradient techniques, involve changing the input in controlled ways to observe the magnitude of the effect or the change on the output. This may be performed by switching off certain values of the input or substituting values drawn from specific probability distributions. The choice of perturbations is often dependent on the type of data and the classification problem. For images, the perturbations typically involve dividing the image into regions (superpixels) of similar textures and colors and perturbing the superpixels. Perturbing individual pixels is not typically performed because perturbing individual pixels can cause adversarial behavior.

Local Interpretable Model Agnostic Explanations (LIME) is an example of a perturbation technique for generating heatmaps. LIME includes creating perturbed instances of a given image, such as the image 102, by randomly covering super pixels with a perturbation (e.g., black pixels). Once a sufficient number of perturbed images have been generated (e.g., a few thousand), these images are passed through the classifier model in order to compute how much the classification output changes for each perturbation.

Figure 1D:
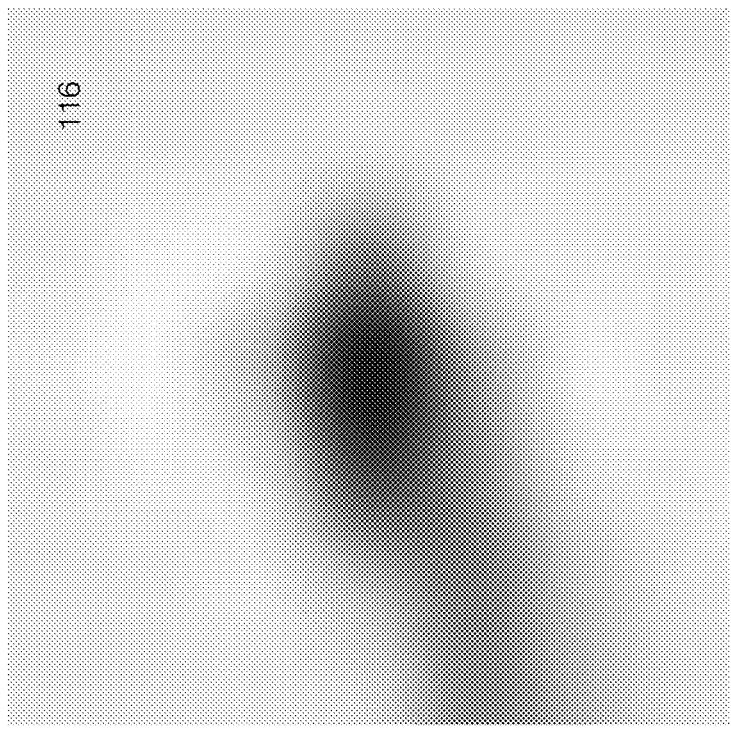
FIG. 1D discloses an enlarged version of a heatmap generated using a local interpretable model agnostic explanations (LIME) technique.

With these changed classification probabilities and perturbed images, a linear model is trained and can be used to determine the importance of each superpixel for or against the classification of the image in a given class. The heatmap 110 is an example of a LIME heatmap. As illustrated in FIG. 1A, the heatmap 110 is much coarser than the heatmaps 104 and 106, which are gradient-based heatmaps. FIG. 1E illustrates a heatmap 118, which is a larger version of the heatmap 110.

The intuition behind LIME is that complex non-linear models, such as neural networks, are not interpretable. Thus, the surrogate linear model helps in interpreting a given classification in the local neighborhood around a specific instance. The local neighborhood is the set of perturbed images generated by randomly covering superpixels in the image.

As previously stated, and as illustrated in the heatmap 110 in FIG. 1A, the use of superpixels makes LIME heatmaps such as the heatmap 110 much coarser than the heatmap 104. LIME heatmaps are also highly dependent on the choice of the algorithm that segments the image into superpixels, as well as the related hyperparameters.

The influence of hyperparameters makes LIME vary considerably between multiple runs. Although this is a common behavior in perturbation techniques, the dependence on superpixels accentuates the problem in LIME explanations.

Meaningful perturbations is another perturbation technique that attempts to overcome the perceived problems of LIME using an optimization approach based on gradient descent. This technique is based on naturalistic perturbations that are achieved by up-sampling circular perturbations from lower resolutions.

Figure 1F:
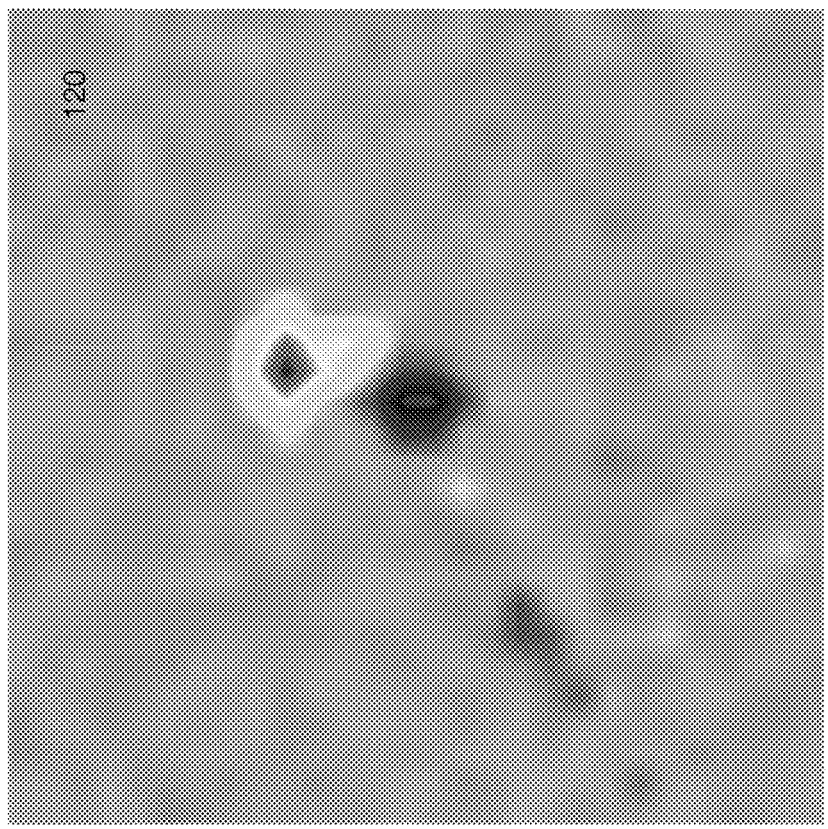
FIG. 1F discloses aspects of up sampling a perturbation.
Figure 1E:
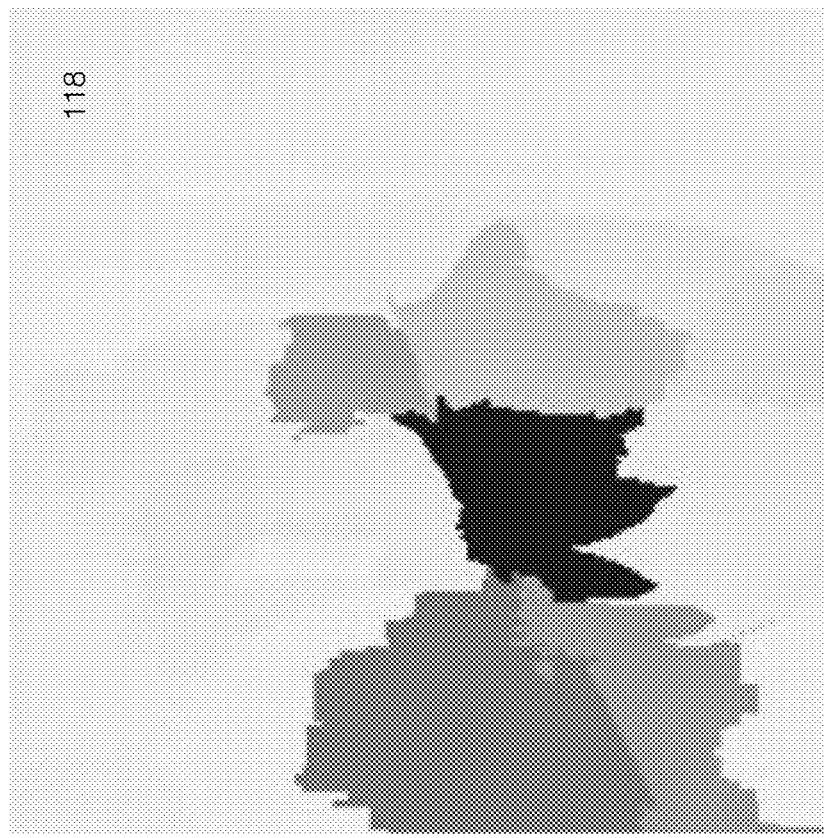
FIG. 1E discloses aspects of a heatmap generated using a meaningful perturbations-based technique.

FIG. 1F illustrates an example of a heatmap 120 generated by meaningful perturbations. This is illustrated in Meaningful Perturbation Flute Heatmap at github.com/KMJ901122/Tensorflow-Interpretable-Explanations-of-Black-Boxes-by-Meaningful-Perturbation/blob/master/result/flute_heatmap.png, 2022 Aug. 11, which is incorporated by reference.

Figure 1G:
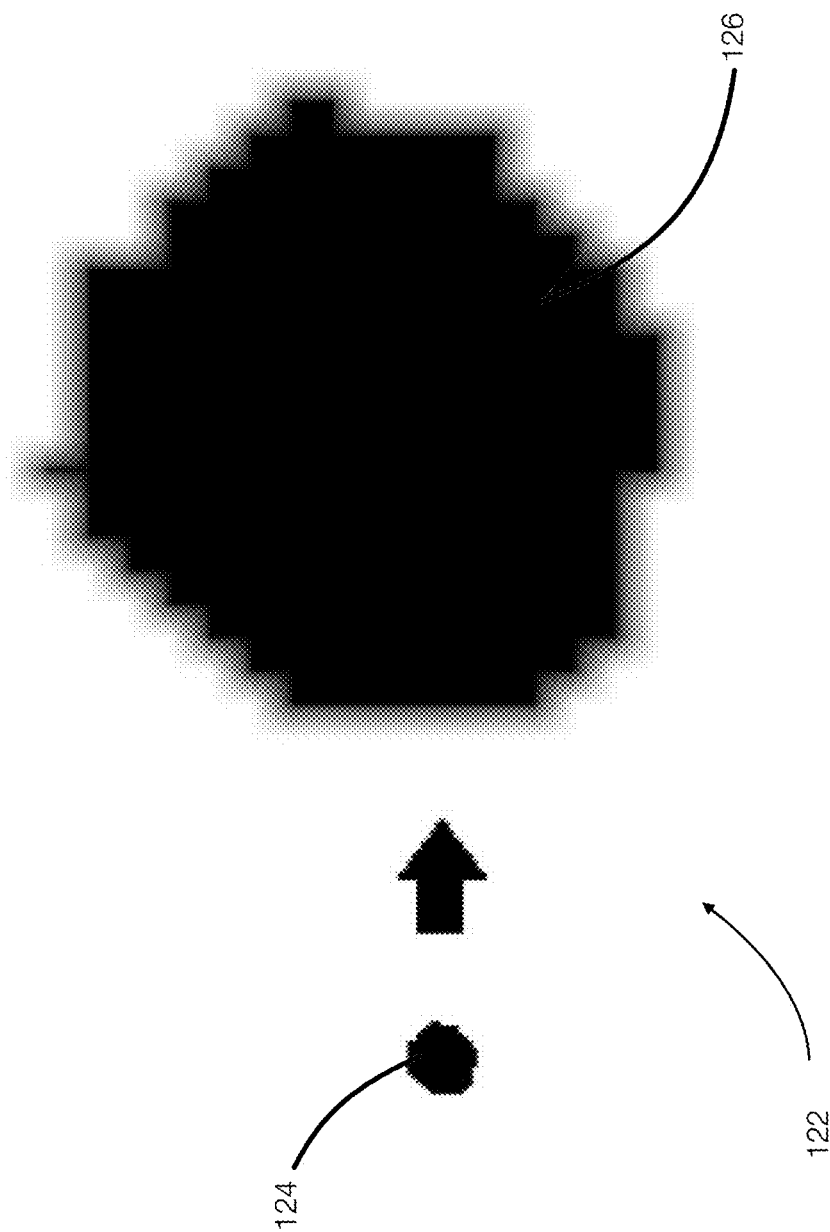
FIG. 1G discloses aspects of up-sampling.

FIG. 1G illustrates aspects of up-sampling in meaningful perturbation. The up-sampling 112 in FIG. 1G up-samples a circular perturbation 124. Up-sampling, as illustrated in FIG. 1G, generates a fuzzier, blurrier, region 126 that can be overlayed onto the image of interest as a mask. This up-sampled mask is then optimized via gradient descent to try and reduce the correct prediction probabilities as much as possible.

The assumptions associated with making perturbations naturalistic are a limitation of this technique. First, by limiting the search space of perturbations to ellipsoidal up-sampled blobs, it is possible that finer detailed perturbations that better represent the behavior of the classifier are missed. A neural network may classify images using features that are not 'natural' to human users, which is further indicated by extensive existing results on adversarial attacks against neural networks. Second, the assumptions required by the meaningful perturbations technique increase the number of adjustable hyperparameters and make optimization more difficult. Third, the very nature of this type of perturbation results in heatmaps that are coarser compared to heatmaps generated using gradient techniques.

At least some embodiments of the invention may be viewed as perturbation-based heatmap generation and, although related to perturbation techniques, overcome the coarseness problem of other perturbation techniques.

Class activation maps (CAM) is another method used to generate saliency heatmaps. CAM methos are typically related to the use of Convolutional Neural Networks (CNNs) for image classification, which are based on the intuition that the last convolutions in a network contain the deepest abstractions extracted by the network. CAM methods attempt to combine these feature maps into an explanation, often through weighting of the feature maps by some parameters.

One common CAM technique is called GradCAM. GradCAM, for a given image classification, computes the gradients from the final prediction neuron back to the last convolutional layer. The intuition is that the last convolutional layer contains the deepest abstractions learned by the network.

Each of the feature maps in this layer are then summed, but the sum is weighted by the gradients from the output to each feature map. The result is a weighted average of the last convolution's feature maps.

However, in a typical convolutional network, the last convolution layer outputs feature maps that are much smaller in size than the original image. In order to generate usable heatmaps, those feature map outputs are upscaled to the dimensions of the full image. This resizing operation makes GradCAM heatmaps considerably blurry. The upscaled heatmap may include large blobs covering parts of the image that roughly correspond to the classified instance. The same procedure of applying ReLU and a channel-wise maximum is used to reduce the heatmap from 3 channels to one, as discussed with vanilla gradients.

The heatmap 108 is an example of a heatmap generated by GradCAM. FIG. 1D illustrates a heatmap 116, which is a larger version of the heatmap 108.

Classifier Engine and Saliency Heatmaps

The classifier engine, in one example, is configured to generate saliency heatmaps or explanations, which allows the classification of an image to be explained. The classifier engine explains the classification by finding or identifying the pixels that contain the most relevant features of a particular classification. In one embodiment, this is achieved by maximizing the prediction for a given class (e.g., flute/transversal-flute) while minimizing the number of pixels used.

Embodiments of the invention may involve gradient descent optimization. Embodiments of the invention, in addition to including aspects of gradient techniques, also include perturbation techniques, but does not involve any of the limiting aspects that occur with perturbation up-sampling techniques. In embodiments of the invention, an image is gradually covered in black (e.g., perturbations) or otherwise perturbed until only the most relevant pixels remain in the context of image classification. Thus, embodiments of the invention may include aspects of perturbations without suffering from the problem of adjusting hyperparameters.

Embodiments of the invention, unlike conventional techniques, also generate an explanation from the actual model being studied and not from a surrogate model trained to mimic the model locally around a given prediction as in LIME.

Generally stated, embodiments of the invention gradually turn off (e.g., change to black or perturb) pixels of a given image in order to maximize or improve a given class prediction. Embodiments of the invention seek a heatmap mask $\mathbb{M}_{max}$ that, when multiplied pixelwise (e.g., Hadamard multiplication $\otimes$) over the pixels p of an image $\mathbb{I}$ generates a masked image $\mathbb{I}_{masked} = \mathbb{M}_{max} \otimes \mathbb{I}$, which maximizes a specific class c for a given classifier model $\phi$ while using a minimum number of pixels for this task. This task is summarized by the equation $$c = \underset{c}{\operatorname{argmax}} \underset{p}{\operatorname{argmin}} = \phi_{\mathbb{M}_{max} \otimes \mathbb{I}}.$$

This optimization is achieved, in one example, using two loss functions. One of the loss functions relates to minimizing the contributions of pixels and the other loss function relates to maximizing the class prediction.

The class loss is defined as follows: $L_{class} = 1 - y_c$.

In this example, $y_c$ is the prediction for the class c. In an image classifier this corresponds to the output of the neuron for the class c on the final softmax (a function that converts a vector of real numbers into a probability distribution) layer. By this definition, a value of $L_{class} = 0$ indicates that the neural network is 100% certain that the image belongs to class c ($y_c = 1$).

The loss $L_{pixels}$ is related to minimizing the contribution of the pixels. In this context, the mask $\mathbb{M}$ is defined and initialized as an array of floats where all elements are valued at 1. In addition, the mask $\mathbb{M}$ has the same dimensions as the image that is being classified and/or for which an explanation or saliency heatmap is being generated. In one example, the dimensions of images used in experiments discussed in more detail below are 224×224×3, which is a standard input size for the EfficientNetB0 model.

By defining the mask $\mathbb{M}$ in this manner, the initial mask ($\mathbb{M}_0$), when multiplied pixelwise with the image, returns the same image $\mathbb{I} = \mathbb{I} \otimes \mathbb{M}_0$. $\mathbb{M}_0$ can also be viewed or understood as a mask where every pixel is unchanged or 100% on with no modifications.

The loss $L_{pixels}$ can be defined, for a given optimization iteration t as:

$$(L_{pixels})_t = \frac{\sum \mathbb{M}_t}{\sum \mathbb{M}_0}.$$

When this sum is performed over all the pixels in the masks and $\Sigma \mathbb{M}_0$ is equivalent to the number of elements in the mask array. In the above specific example, $\Sigma \mathbb{M}_0$ is 224*224*3=150, 528.

In one example, the value of $L_{pixels}$ starts at 1. $L_{pixels}$ is then minimized by gradient descent by turning pixels in the mask (image) off. A value of $L_{pixels}=0$ indicates that all pixels in the image are turns off completely and a value of $L_{pixels}=1$ indicates that all pixels are unchanged.

The total loss is given by: $L_{total}=L_{class}+L_{pixels}$.

In one example, this loss is minimized using an Adam optimizer with learning rate decay to aid convergence. In one example, the only hyperparameters for embodiments of the invention are the hyperparameters related to the gradient descent: learning rate, number of optimization iterations, learning rate decay, which is a substantial decrease in adjustable parameters compared to other perturbation techniques. Embodiments of the invention avoid hyperparameters in the other perturbation techniques that are related to superpixel segmentation, perturbation up sampling, and surrogate model training, among others.

After the optimization, a final mask $\mathbb{M}_{final}$ is obtained. A masked image $\mathbb{I}_{masked}$ is obtained that shows how few pixels a network could use and still maximize a given output. To transform the output into a one-dimensional saliency heatmap, the same reLu plus channel wise procedure is performed:

$$\mathbb{HT}_{classifier} = \max_{channel} ReLU(\nabla_c \phi_{\mathbb{I}}).$$

Figure 2A:
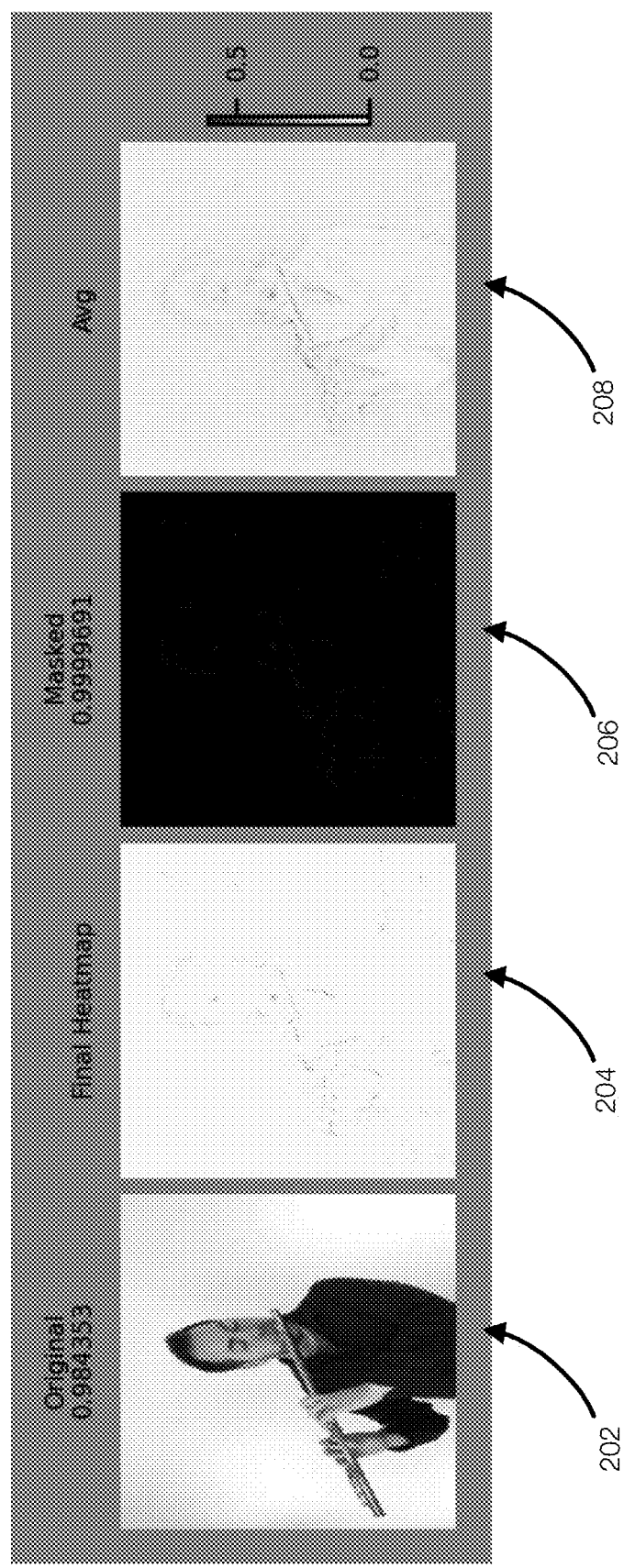
FIG. 2A discloses aspects of a panel illustrating a heatmap and an average heatmap generated in accordance with embodiments of the invention.

FIG. 2A discloses aspects of an output of the classifier engine. FIG. 2A illustrates an original image 202 (e.g., ImageNet class 558 flute/transversal flute) with a prediction probability of 0.984353. The final heatmap 204 is a final optimized heatmap ($\mathbb{M}_{max}$) output by a classifier engine. The image 206 is the original image multiplied with the final mask 206, which mask 206 has a final prediction probability of 0.9999691. The heatmap 208 represents an average of all heatmaps obtained throughout the optimization process.

FIG. 2A illustrates that the final masked image 206 looks, in essence, like a completely black square. However, the EfficientNetB0 model classifies the image 206 as a "flute/transversal flute" with a softmax probability of 99.99% while the original image of the flautist was classified correctly with a probability of 98.43%. The final heatmap 204 reveals the contours of the flute, hand and facial features of the flautist. By averaging all the heatmaps obtained throughout the iterations of the optimization more details can be ascertained as illustrated in the image 208.

Embodiments of the invention find detailed fine features and are also able to generate very high confidence predictions of a given class, while using only information that was present in the original image. In other words, the original image is unchanged during the optimization and only the values of the mask are trained via gradient descent.

Figure 2B:
FIG. 2B discloses an enlarged version of a final heatmap shown in FIG. 2A.
Figure 2C:
FIG. 2C discloses aspects of an enlarged version of an average heatmap shown in FIG. 2A.

FIG. 2B illustrates a heatmap image 220, which is a larger version of the image 204. FIG. 2C illustrates a heatmap image 222, which is a larger version of the image 208.

A visual inspection of the heatmaps illustrated in FIG. 2A-2C provide a qualitative assessment of the quality and advantages of embodiments of the invention compared to the heatmaps illustrated in FIGS. 1A-1G.

Figure 3:
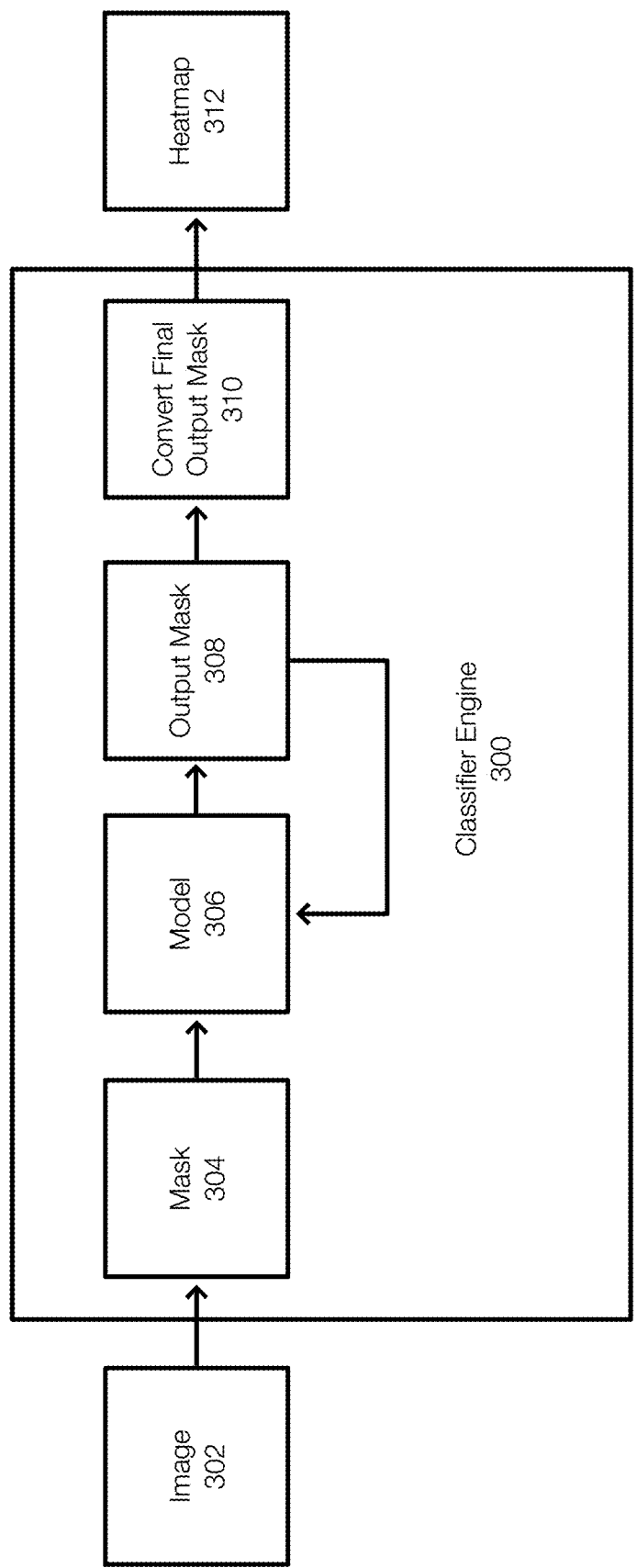
FIG. 3 discloses aspects of a classifier engine configured to generate a heatmap.

FIG. 3 discloses aspects of a classifier engine configured to generate saliency heatmaps. FIG. 3 illustrates a classifier engine 300. The classifier engine 300 may include a computing device (e.g., physical device, virtual device, container) that includes processors, memory, and other hardware. The classifier engine 300 is configured to receive an image 302. Using the image 302, an original or initial mask 304 is generated. The original mask 304 is, in one example, an exact copy of the image 302 and is generated using pixelwise multiplication. The mask 304 is input to the model 306, which generates an output mask 308.

The output mask 308 is iteratively or repeatedly trained via gradient descent in order to minimize a custom loss function that maximizes a target class prediction (predicted by the model 306) and minimizes the number of pixels contributing to the classification. The training continues either until the loss value converges within a defined threshold, or until a number of user-defined training steps has been met. Once an output is reached by this process, the final output mask is converted to a heatmap 312. The heatmap 312 would be classified, in one example, similarly to or the same as the image 302.

In one example, gradient descent allows pixels that are contributing less to a classification performed by the classifier engine to be reduced. Over many iterations, many of the pixels in the output mask are, using gradient descent, turned to black. Gradient descent allows pixels that are not contributing to the classification or that are contributing less to the classification (e.g., compared to other pixels or features) to have their values gradually reduced to black. Once a pre-determined number of iterations have been performed (e.g., the output mask is repeatedly run through the model 306) or when a loss value converges, many of the pixels in the output mask have been turned to black. The pixels that still have value in the output mask when the loss value converges or after the set number of iterations are those that contributed most to the classification. Thus, the output mask identifies these pixels. The final output mask, when visualized as a heat map, illustrates the pixels that contributed to the classification. These pixels may have different values as their contributions may vary.

Figure 4:
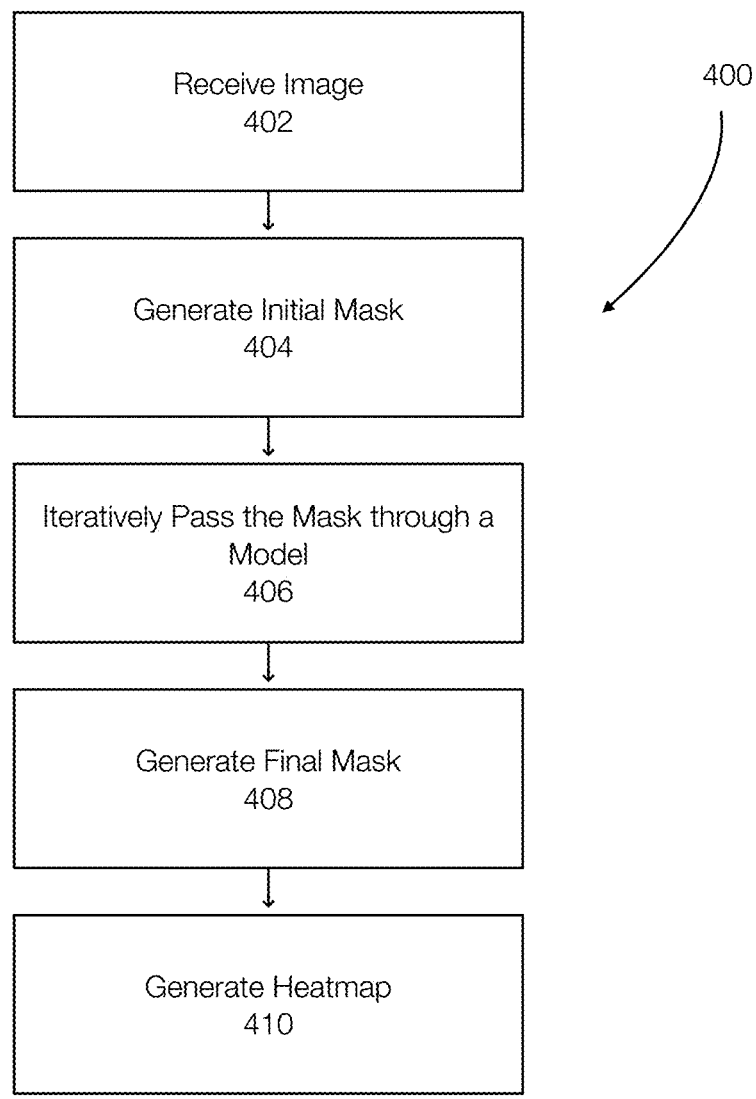
FIG. 4 discloses aspects of generating a heatmap.

FIG. 4 discloses aspects of generating a heatmap for an image. In the method 400, an image may be received 402. A mask is generated 404 from the image. Thus, the original image is unchanged. The mask is iteratively passed through or processed 406 by a model. More specifically, the initial mask is passed through the model and the output is then used as the next input to the model.

After each iteration, the loss metric $L_{total}=L_{class}+L_{pixels}$ may be determined. Once the loss metric satisfies a threshold, which may be determined, the iterations of the output through the model may terminate and the final mask is generated 408. Stated differently, the last output of the model becomes the final mask. If necessary, the heatmap is generated 410 from the final mask. In other embodiments, multiple heatmaps may be generated and an average heatmap may also be generated.

The following discussion describes experiments that were conducted to provide a more concrete and qualitative description of embodiments of the invention.

Experiments and Results

In one example, XAI methods are evaluated using a dataset with bounding box annotations may be used. The bounding boxes may illustrate where an object of a given class is located in an image. A large open dataset of this kind is called Open Images, which is maintained by Google. This dataset contains annotated images of various classes with detailed bounding box metadata and fine-grained labels.

For one experiment, 100 images from 5 different classes (20 images per class) were selected: dogs, cats, birds, bicycles and cars. Each image contains bounding boxes describing the localization of the objects in the image, which may contain one or more instances of the given class, and which may also contain objects of other classes.

The experiment was performed on two architectures or models: EfficientNetB0 and ResNet50. These models are available with pre-trained weights on ImageNet through the Tensorflow framework.

Models pre-trained on ImageNet are trained on 1000 classes, which includes dozens of different dog breeds, bird types, and the like.

Although the classes on ImageNet and Open Images are not the same, they are built upon the same WordNet synsets and it is possible to exactly map them to one another. In simple terms, it is possible to map classes such as "Border Collie" and "Shetland Terrier" (ImageNet Classes) to "Dog" (OpenImage class) by using WordNet from the NLTK Natural Language Processing library.

FIG. 5 illustrates a table 500 of mappings between ImageNet and OpenImage classes. The ImageNet classes 502 are mapped to the OpenImage classes 504.

The experiment is performed to determine whether embodiments of the invention can generate or provide heatmaps with the same level of detail as other conventional techniques.

As previously stated, gradient techniques surpass perturbation techniques with regard to level of detail. Consequently, this experiment compares embodiments of the invention to vanilla gradients and smooth gradients. Because smooth gradients uses an average of a series of noisy heatmaps, the averaged heatmap generated by embodiments of the invention may be used as the explanation or heatmap for purposes of this experiment.

In embodiments of the invention and in vanilla and smooth gradient techniques, the final output is a heatmap in which each pixel has a value indicating the importance of that pixel for classification. If a threshold is set and a value of a pixel is above that threshold, that pixel is considered to be a hit and it may be possible to count the number of hits that fall within a bounding box for the correct class.

Figure 6:
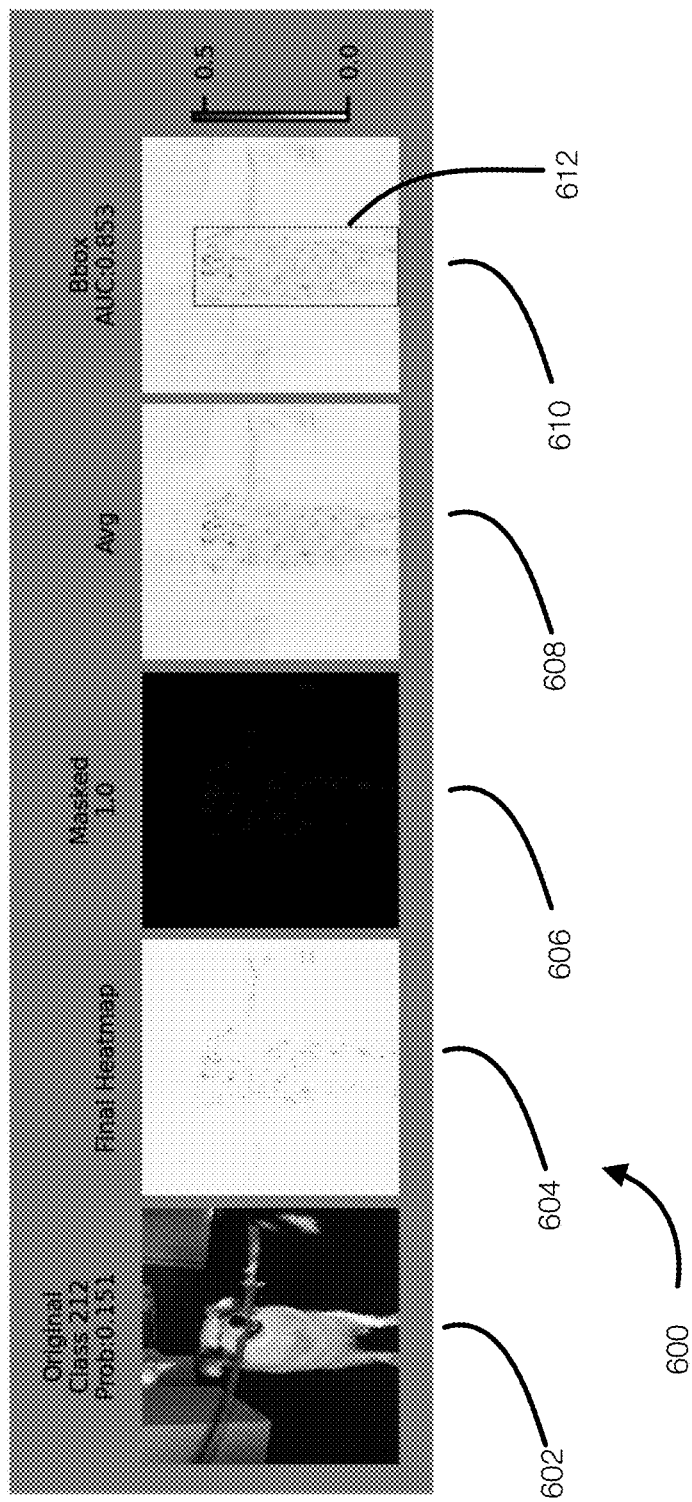
FIG. 6 discloses aspects of a bounding box for evaluating heatmap generation techniques.

FIG. 6 discloses aspects of generating a heatmap in the experiment. The panel 600 includes an original image 602, a final heatmap 604, a final mask 606, an average heatmap 608, and the average heatmap 608 with a bounding box 612. In this example, the final heatmap 604 is a visualization of the final mask 606.

In one example, a threshold of 70% of the maximum value is set for the heatmap. In this case there are four possibilities:

True Positives (TP): Pixels that have values above the threshold and fall within the bounding box.

False Positives (FP): Pixels that have values above the threshold and fall outside the bounding box.

True Negatives (TN): Pixels that have values below the threshold and fall outside the bounding box.

False Negatives (FN): Pixels that have values below the threshold and fall inside the bounding box.

The number of hits and their description (TP, FP, TN, FN) vary when the threshold is varied. By computing TP, FP, TN and FN for various thresholds, the AUC (Area Under Curve) metric may be computed for each image. In this example, the AUC provides a quantitative expression of how well the explanation by a given XAI method, for a given model, in a given image, corresponds to the bounding box defined in the dataset.

Alternatively, an object detection metric such as Intersection-over-Union (IoU) could be used, but this metric is defined typically for geometric objects that overlap, such as two square or ellipsoidal bounding boxes, rather than this problem where sets of scattered points are being compared.

IN this example, AUC is used. Larger values of AUC indicate a better performance of the XAI method.

In the experiment, an AUC evaluation was obtained for each of the 100 images, for each model and for each XAI method. This results in 600 AUC values. The AUC values can be averaged per XAI method and compared. A statistical test may help ensure that the differences between the averages are significant. Because there are no guarantees that these AUC values are distributed normally, the statistical test chosen is the Mann-Whitney U-test. As previously discussed, smooth gradients involves calculating the average of a number of noisy gradient maps. In embodiments of the invention, this number corresponds to the number of optimization iterations as each iteration yields a heatmap in embodiments of the invention. The experiment used the same number of iterations in this experiment was set to 800, which is empirically sufficient to ensure convergence for the loss minimization in embodiments of the invention. Additionally, the learning rate used for the Adam optimizer in embodiments of the invention was 0.1, with a decay rate of 0.1, every 200 iterations, to aid convergence. The effect of varying these hyperparameters was not a focus of this particular experiment, after initial tests showed that the heatmaps were still largely highlighting the same contours in the images. Vanilla gradients, by its formulation, does not have any hyperparameters to be adjusted.

Figure 7:
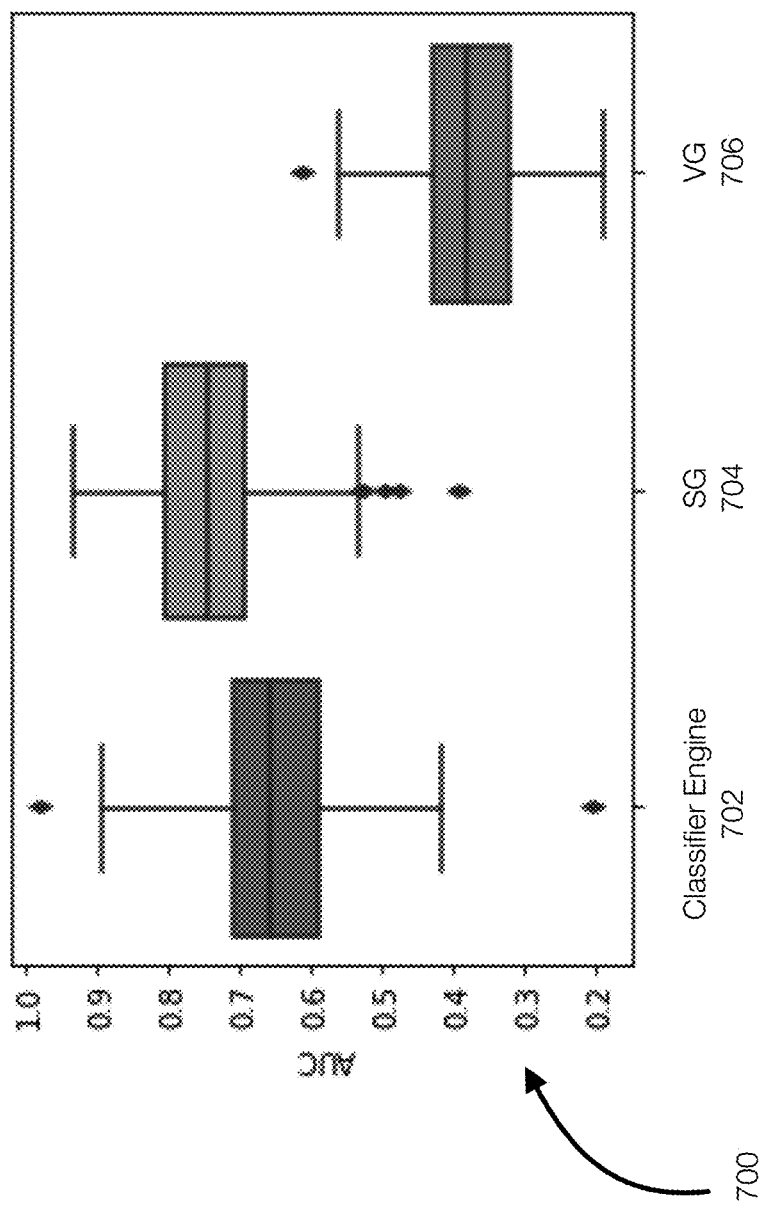
FIG. 7 discloses a boxplot comparing heatmap generation techniques.

FIG. 7 illustrates results of the experiment. FIG. 7 illustrates a boxplot 700. For the image 602, embodiments of the invention has an AUC of 0.852, smooth gradients had an AUC of 0.861, and vanilla gradients had an AUC of 0.471. The boxplot 700 illustrates that the SG technique 704 slightly outperformed the classifier engine 702. Both the SG technique 704 and the classifier engine 702 outperformed the VG technique 706.

The Mann-Whitney U-test indicated that the differences between these performances are statistically significant between all methods. However, the AUC metric is not definitive because these methods used in the experiment tend to highlight features differently. Embodiments of the invention, in contrast to the other methods, tend to show contours and edges of objects. In fact, the results of this experiment as well as the AUC values tend to show that the pixels and contours highlighted by embodiments of the invention tend to correspond to the expected objects in the images, as per the bounding boxes of the OpenImages dataset. In other words, for a given image with a bounding box for a dog, embodiments of the invention often highlights the edges/contours of the dog within the bounding box.

Because embodiments of the invention tend to highlight edges/contours of the object rather than the entire object, this correlates with the assumption that embodiments of the invention highlight fewer pixels. Consequently, embodiments of the invention have a lower AUC score compared to the SG technique, which tends to highlight more pixels over the entire object and not just the edges/contours.

Figure 8:
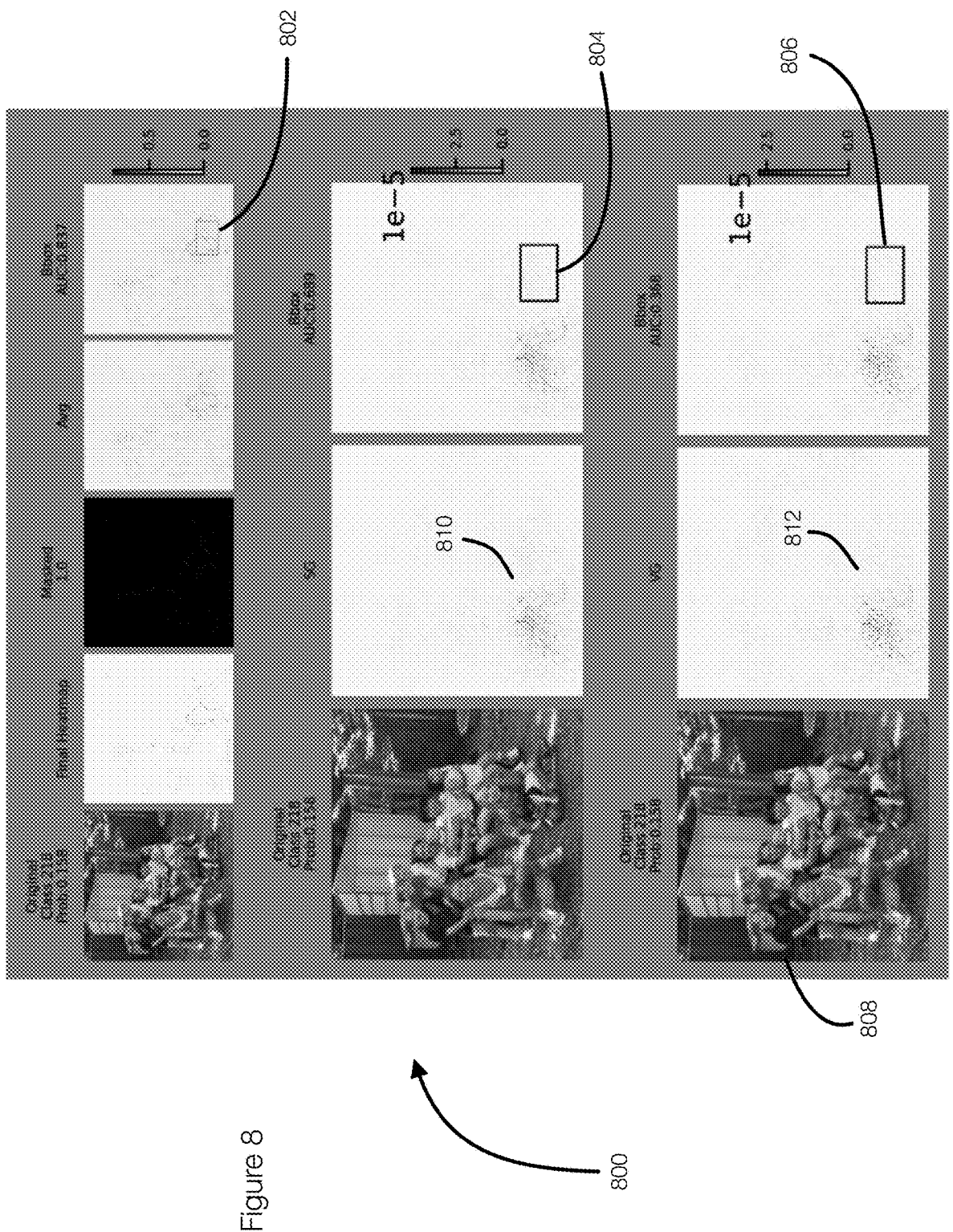
FIG. 8 discloses aspects of heatmap generation techniques that incorrectly classify an image and of a technique that correctly classifies an image.

FIG. 8 discloses additional aspects of image classification. FIG. 8 illustrates a panel 800. In the panel 800, heatmaps for an image 808 were generated using embodiments of the invention, SG, and VG methods. The class being evaluated was dog. In the panel 800, as illustrated by the bounding boxes 804 and 806, the SG and VG methods highlighted objects (objects 810 and 812) that were outside of the bounding boxes 804 and 808 and that were not a dog. The classifier engine, however, highlighted the correct object for the given class as illustrated by the bounding box 802.

The experiment demonstrated that embodiments of the invention (e.g., the classifier engine) provides or generates explanations that have a similar level of fine detail compared to gradient methods while highlighting the correct objects in an image more frequently than vanilla gradients and about as often as smooth gradients. This result, however, is remarkable given the perturbation aspects of the classifier engine or in embodiments of the invention.

As illustrated, embodiments of the invention allow a user to verify whether a model has incorporated or learned relevant concepts and features regarding some class in a dataset. Advantageously, embodiments of the invention include a perturbation technique that achieves detail that is comparable to gradient techniques.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, gradient and/or perturbation-based methods for generating explanations, AI and ML operations, and the like.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure®, Amazon AWS®, Dell EMC@ Cloud Storage Services, and Google Cloud®. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

It is noted that any operation(s) or methods discloses herein and in the Figures, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving an image at a classifier engine;
  generating an initial mask of the image, passing the initial mask through a model to generate an output mask, iteratively passing the output mask through the model until the output mask satisfies a loss threshold, wherein the output mask becomes a final output mask, and generating a heatmap from the final output mask.

Embodiment 2. The method of embodiment 1, further comprising gradually changing values of pixels in the mask that contributing less to a classification performed by the classifier engine to black, wherein the values of the pixels that are contributing less are reduced at each iteration.

Embodiment 3. The method of embodiment 1 and/or 2, wherein gradually changing the values of pixels that are contributing less to the classification to black includes gradually changing the values of the pixels to 0 using gradient descent, wherein only pixels in the final output mask that contribute to the classification have a value greater than 0.

Embodiment 4. The method of embodiment 1, 2, and/or 3, further comprising determining a loss value at each iteration.

Embodiment 5. The method of embodiment 1, 2, 3, and/or 4, wherein the loss value is a combination of a class loss and a pixel loss.

Embodiment 6. The method of embodiment 1, 2, 3, 4, and/or 5, wherein the class loss is a difference between 1 and a class prediction and wherein the pixel loss is a sum of values in the mask for a given optimization divided by a sum of values in the initial mask.

Embodiment 7. The method of embodiment 1, 2, 3, 4, 5, and/or 6, further comprising performing gradient descent in each iteration.

Embodiment 8. The method of embodiment 1, 2, 3, 4, 5, 6, and/or 7, wherein iteratively passing the output mask through the model is configured to minimize contributions of pixels while maximizing a class prediction.

Embodiment 9. The method of embodiment 1, 2, 3, 4, 5, 6, 7, and/or 8, wherein the heatmap is determined by multiplying the image with the final output mask.

Embodiment 10. The method of embodiment 1, 2, 3, 4, 5, 6, 7, 8, and/or 9, further comprising performing a Relu function to generate the heatmap.

Embodiment 11. A system, comprising hardware and/or software, operable to perform any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
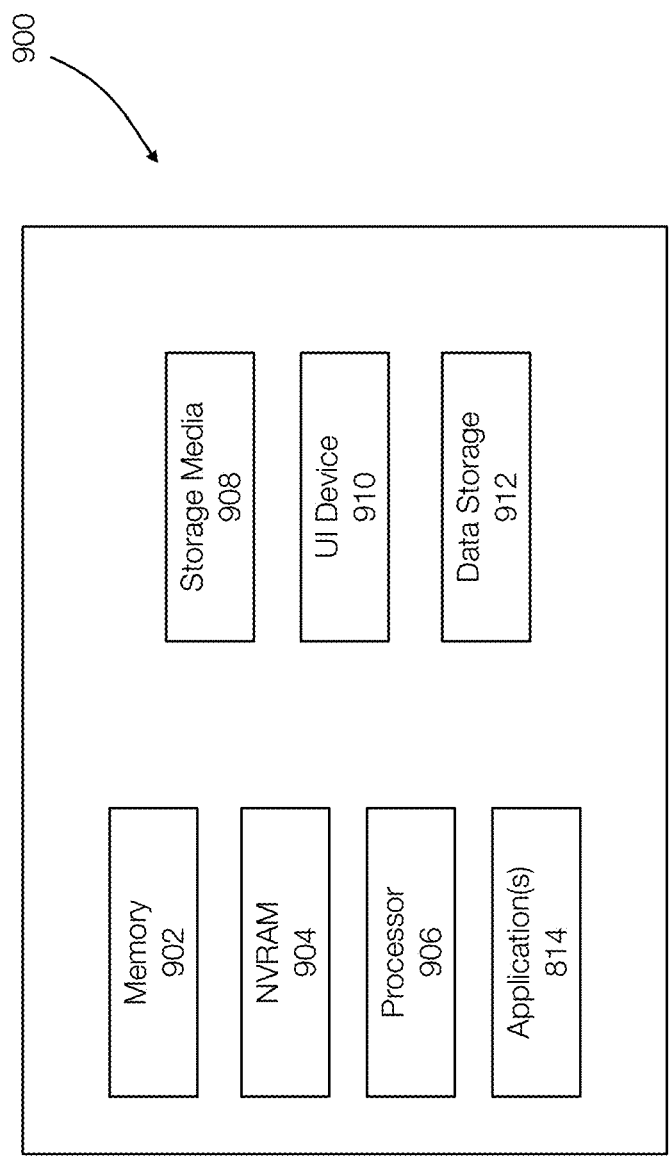
FIG. 9 discloses aspects of a computing device, system or entity.

With reference briefly now to FIG. 9, any one or more of the entities disclosed, or implied, by the Figures, and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random-access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid-state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving an image at a classifier engine;
generating an initial mask of the image;
passing the initial mask through a model to generate an output mask;
iteratively passing the output mask through the model until the output mask satisfies a loss threshold, wherein the output mask becomes a final output mask;
determining a loss value at each iteration, wherein the loss value is a combination of a class loss and a pixel loss, wherein the class loss is a difference between 1 and a class prediction and wherein the pixel loss is a sum of values in the mask for a given optimization divided by a sum of values in the initial mask; and
generating a heatmap from the final output mask, wherein the heatmap is a saliency heatmap that provides an explanation for a classification of the image generated by the classifier engine.

2. The method of claim 1, further comprising gradually changing values of pixels in the mask that contributing less to the classification performed by the classifier engine to black, wherein the values of the pixels that are contributing less are reduced at each iteration.

3. The method of claim 2, wherein gradually changing the values of pixels that are contributing less to the classification to black includes gradually changing the values of the pixels to 0 using gradient descent, wherein only pixels in the final output mask that contribute to the classification have a value greater than 0.

4. The method of claim 1, further comprising performing gradient descent in each iteration.

5. The method of claim 1, wherein iteratively passing the output mask through the model is configured to minimize contributions of pixels while maximizing a class prediction.

6. The method of claim 1, wherein the heatmap is determined by multiplying the image with the final output mask.

7. The method of claim 1, further comprising performing a Relu function to generate the heatmap.

8. A non-transitory storage medium having stored therein instructions that are executable by one or more hardware processors to perform operations comprising:
receiving an image at a classifier engine;
generating an initial mask of the image;
passing the initial mask through a model to generate an output mask;
iteratively passing the output mask through the model until the output mask satisfies a loss threshold, wherein the output mask becomes a final output mask;
determining a loss value at each iteration, wherein the loss value is a combination of a class loss and a pixel loss, wherein the class loss is a difference between 1 and a class prediction and wherein the pixel loss is a sum of values in the mask for a given optimization divided by a sum of values in the initial mask; and
generating a heatmap from the final output mask, wherein the heatmap is a saliency heatmap that provides an explanation for a classification of the image generated by the classifier engine.

9. The non-transitory storage medium of claim 8, further comprising gradually changing values of pixels in the mask that contributing less to a classification performed by the classifier engine to black, wherein the values of the pixels that are contributing less are reduced at each iteration.

10. The non-transitory storage medium of claim 9, wherein gradually changing the values of pixels that are contributing less to the classification to black includes gradually changing the values of the pixels to 0 using gradient descent, wherein only pixels in the final output mask that contribute to the classification have a value greater than 0.

11. The non-transitory storage medium of claim 8, further comprising performing gradient descent in each iteration.

12. The non-transitory storage medium of claim 8, wherein iteratively passing the output mask through the model is configured to minimize contributions of pixels while maximizing a class prediction.

13. The non-transitory storage medium of claim 8, wherein the heatmap is determined by multiplying the image with the final output mask.

14. The non-transitory storage medium of claim 8, further comprising performing a ReLu function to generate the heatmap.

* * * * *